(12) United States Patent
Brewer

(10) Patent No.: US 7,360,980 B2
(45) Date of Patent: Apr. 22, 2008

(54) FUEL CONTAINER RETRACTABLE SAFETY STRAP

(76) Inventor: Darren J. Brewer, 12002 S. 194th St., Gretna, NE (US) 68028

( * ) Notice: Subject to any disclaimer, the term of this patent is extended or adjusted under 35 U.S.C. 154(b) by 91 days.

(21) Appl. No.: 11/479,060

(22) Filed: Jun. 30, 2006

(65) Prior Publication Data

US 2007/0068204 A1  Mar. 29, 2007

Related U.S. Application Data

(60) Provisional application No. 60/721,815, filed on Sep. 29, 2005.

(51) Int. Cl.
*B60P 7/08* (2006.01)

(52) U.S. Cl. ................ 410/100; 410/96; 410/97

(58) Field of Classification Search .......... 410/96, 410/97, 100, 103; 224/403, 404, 534, 568, 224/572; 248/499

See application file for complete search history.

(56) References Cited

U.S. PATENT DOCUMENTS 4,487,537 A * 12/1984 Morse .................. 410/47

* cited by examiner

*Primary Examiner*—Stephen Gordon
(74) *Attorney, Agent, or Firm*—Adam H. Jacobs

(57) ABSTRACT

A safety strap device for hazardous materials containers includes a hazardous materials container having an outer wall and a retractable safety strap device mounted within the hazardous materials container. The safety strap device includes an extendable and retractable securement strap having an outer end, the securement strap extending outwards from the safety strap device through the outer wall of the hazardous materials container, a biasing device operative to forcibly retract the securement strap into the safety strap device and a strap extension and retraction locking device operative to prevent extension and retraction of the securement strap when engaged. Finally, a latch device is mounted on the outer end of the securement strap for releasably connecting the securement strap to a selected securement point thereby releasably securing the hazardous materials container in an upright position.

12 Claims, 3 Drawing Sheets

FUEL CONTAINER RETRACTABLE SAFETY STRAP

CROSS-REFERENCE TO RELATED PROVISIONAL PATENT

This application claims priority based on a provisional patent, specifically on the Provisional Patent Application Ser. No. 60/721,815 filed Sep. 29, 2005.

BACKGROUND OF THE INVENTION

1. Technical Field

The present invention is directed to safety devices for portable fuel containers and, more particularly, to a retractable safety strap device for a portable fuel container which includes a biased strap retracting mechanism mounted within the fuel container, an extendable and retractable securement strap having a latch mechanism mounted on the outer end thereof for releasably connecting the strap to a selected securement point and a locking mechanism operatively connected to the strap retracting mechanism which, when engaged, prevents extension or retraction of the safety strap thus releasably securing the fuel container in an upright position.

2. Description of the Prior Art

Portable fuel containers are used for a variety of purposes and come in a variety of sizes, from relatively small one gallon sizes up to and including five, ten and fifteen gallon sizes. In general, portable fuel containers include some type of handle and a top opening with a threadably mounted cap covering the top opening. Many of the fuel containers also include an extendable and bendable nozzle which can be connected to and extend outwards from the top opening to facilitate pouring of fuel from the fuel container. The problem universally encountered with fuel containers, however, is that the user of the fuel container must take the fuel container to a gas station or the like in order to fill the fuel container with fuel. For those fortunate few that live close enough to a gas station to walk to the gas station, transport of the fuel container is far safer, but for the vast majority of persons, it is necessary to transport the fuel container in a motor vehicle to the gas station in order to fill the fuel container.

Of course, transport of an empty fuel container presents some hazards, such as ignition of vapors housed within the fuel container, but once the fuel container is filled, particularly with fuel containers of larger sizes, the hazard level increases as it is highly likely that the fuel container will tip over in the vehicle as the vehicle turns unless the fuel container is propped up or wedged into an area of restricted movement. Of course, such a location is not available in all vehicles, and it may be difficult for the vehicle operator to properly wedge or support the fuel container to prevent spilling of the fuel from the fuel container. Moreover, with the majority of motor vehicles, transport of the fuel container must be done within the motor vehicle, and hence any fuel spillage from the fuel container will result in damage to the vehicle's interior. There is therefore a need for a device which will substantially prevent the tipping over of the fuel container while the fuel container is in a vehicle or in another potential tip over situation.

Various gasoline containers have been proposed in the prior art which incorporate various safety features designed to prevent accidental discharge of the gasoline stored within the container, including such devices as Cooper, U.S. Pat. No. 5,564,608, which discloses a transferable safety gasoline container to include an automatic venting pour spout, a protective skirt on top of the gasoline container to prevent damage to valves and fittings, and a pressure release cap which satisfies various regulations associated with gasoline containers, and Messmer, U.S. Pat. No. 4,834,270, which discloses a container for gasoline which includes a hollow body and a main valve which is in the form of a conical plug having a smooth surface whereby liquid poured from the spout pours out in a laminar, hollow cylindrical flow pattern, thus preventing splashing. However, nowhere in the prior art is it disclosed to solve the above-described problem, and therefore this need still exists.

Therefore, an object of the present invention is to provide a safety strap device integrally formed with a gasoline container which will act to substantially prevent accidental tipping of the gasoline container during transport or storage of the container.

Another object of the present invention is to provide a safety strap device for gasoline containers which includes a biased strap retracting mechanism mounted within the fuel container, and extendable and retractable securement strap having a latch mechanism mounted on the outer end thereof for releasably connecting the strap to a selected securement point, and a locking mechanism operatively connected to the strap or tracking mechanism which, when engaged, acts to prevent extension or retraction of the safety strap thus releasably securing the fuel container in its transport and/or storage position.

Another object of the present invention is to provide a safety strap device for gasoline containers which is integrally formed with the gasoline container so that a person using the gasoline container equipped with the safety strap need not carry additional equipment to perform the intended function of the present invention.

Another object of the present invention is to provide a safety strap device for gasoline containers which may be quickly and easily extended and retracted from the fuel container itself so that an individual using the present invention may quickly and easily use the safety strap and just as quickly and easily release and retract the safety strap to facilitate and encourage its use.

Finally, an object of the present invention is to provide a safety strap device for gasoline containers which is relatively simple and inexpensive to manufacture and distribute and which is safe, efficient and effective in use.

SUMMARY OF THE INVENTION

The present invention provides a safety strap device for hazardous materials containers which includes a hazardous materials container having an outer wall and a retractable safety strap device mounted within the hazardous materials container. The safety strap device includes an extendable and retractable securement strap having an outer end, the securement strap extending outwards from the safety strap device through the outer wall of the hazardous materials container, a biasing device operatively associated with the securement strap for forcibly retracting the securement strap into the safety strap device and a strap extension and retraction locking device operatively associated with the securement strap, the locking device operative to prevent extension and retraction of the securement strap when engaged. Finally, a latch device is mounted on the outer end of the securement strap for releasably connecting the securement strap to a selected securement point thereby releasably securing the hazardous materials container in an upright position.

The safety strap device for gasoline containers as thus described provides a substantial advantage over other safety devices for gasoline containers found in the prior art. Whereas the majority of gasoline container safety devices attempt to restrict accidental spillage from the interior of the gasoline container, the present invention is designed to prevent the accidental tipping of the gasoline container itself, which is akin to treating the problem, not the symptom. Furthermore, because the safety strap device of the present invention is integrally formed with the gasoline container, it may be quickly and easily used in virtually any situation where maintaining the upright position of the gasoline container is critical. Also, the safety strap device for gasoline containers of the present invention includes the locking device which not only acts to secure the gasoline container during a transport operation, but also permits the safety strap device to be used for storage purposes as the strap may be used to hang the gasoline container in an elevated position in a selected storage location. This feature gains significance when the present invention is being used in a residential location, as children are inevitably drawn to brightly colored objects such as the bright red of a gasoline container. By elevating the gasoline container of the present invention for storage, children will be prevented from accessing the gasoline container, thereby protecting them. This feature is not found in the prior art. It is therefore seen that the safety strap device for gasoline containers of the present invention provides a substantial improvement over those devices found in the prior art.

DESCRIPTION OF THE PREFERRED EMBODIMENT

Figure 1:
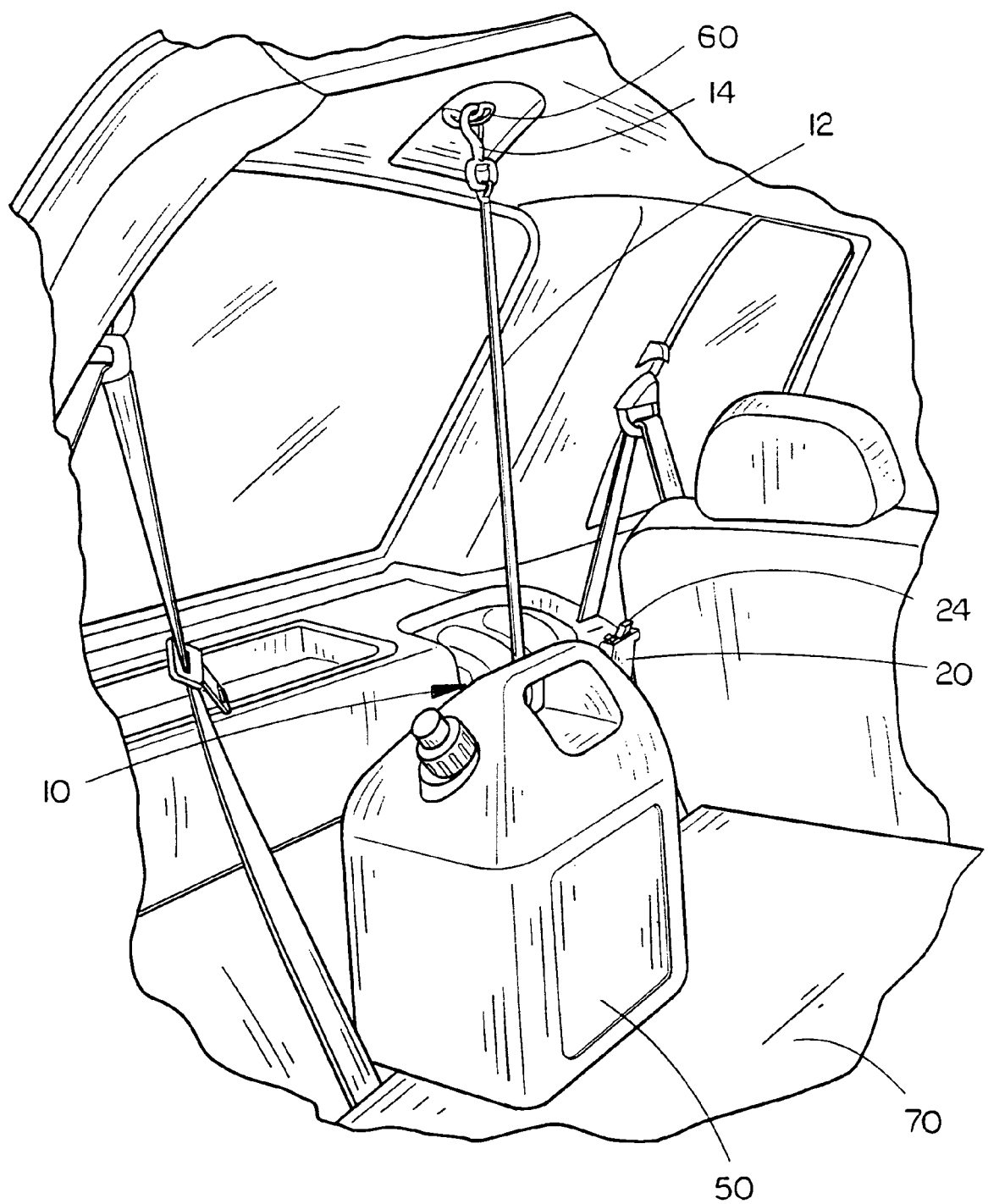
FIG. 1 is a perspective view of a fuel container equipped with the safety strap device of the present invention being secured within a motor vehicle in a safe and secure position.
Figure 2:
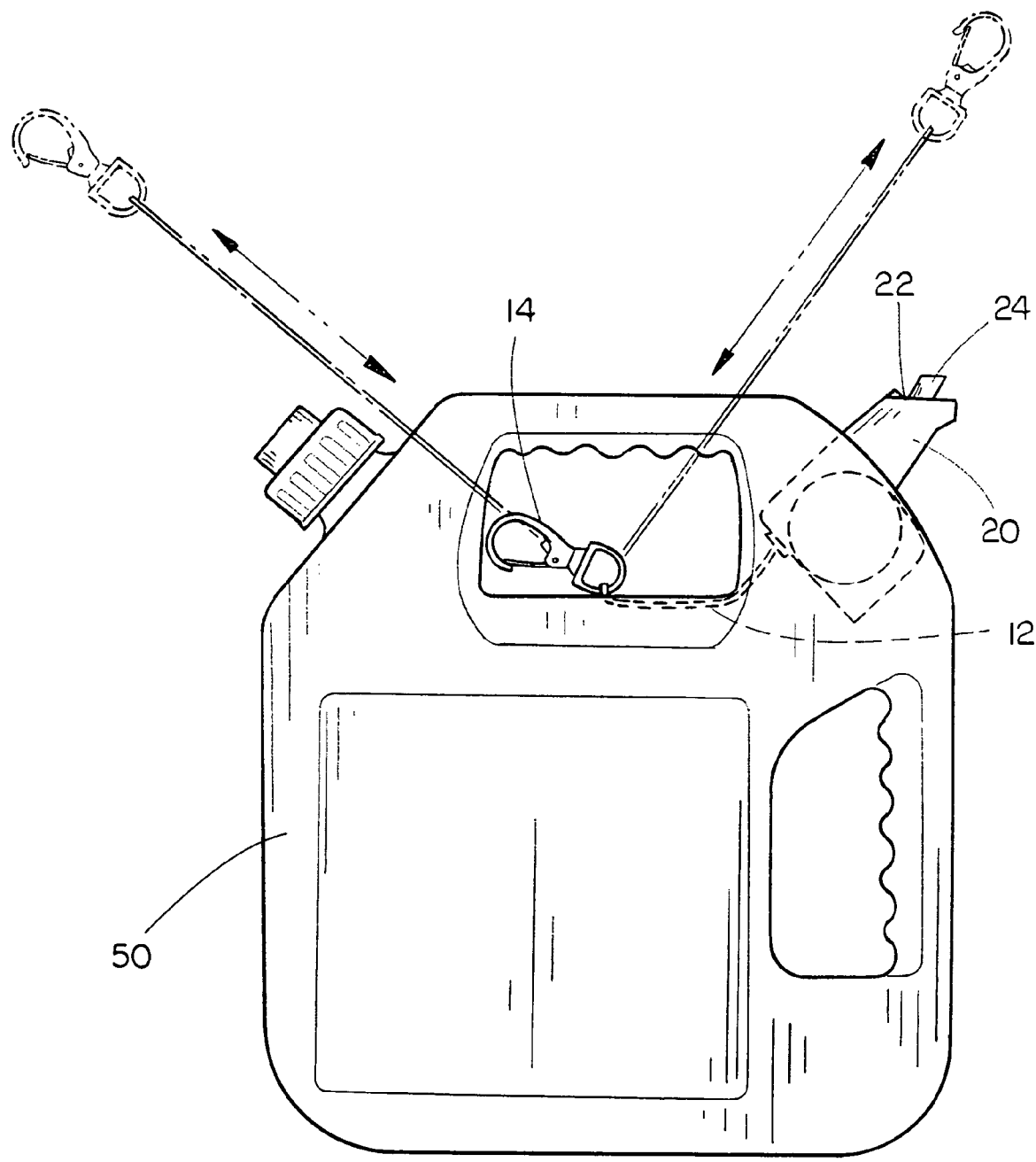
FIG. 2 is a side elevational view of the safety strap device mounted within the fuel container.
Figure 3:
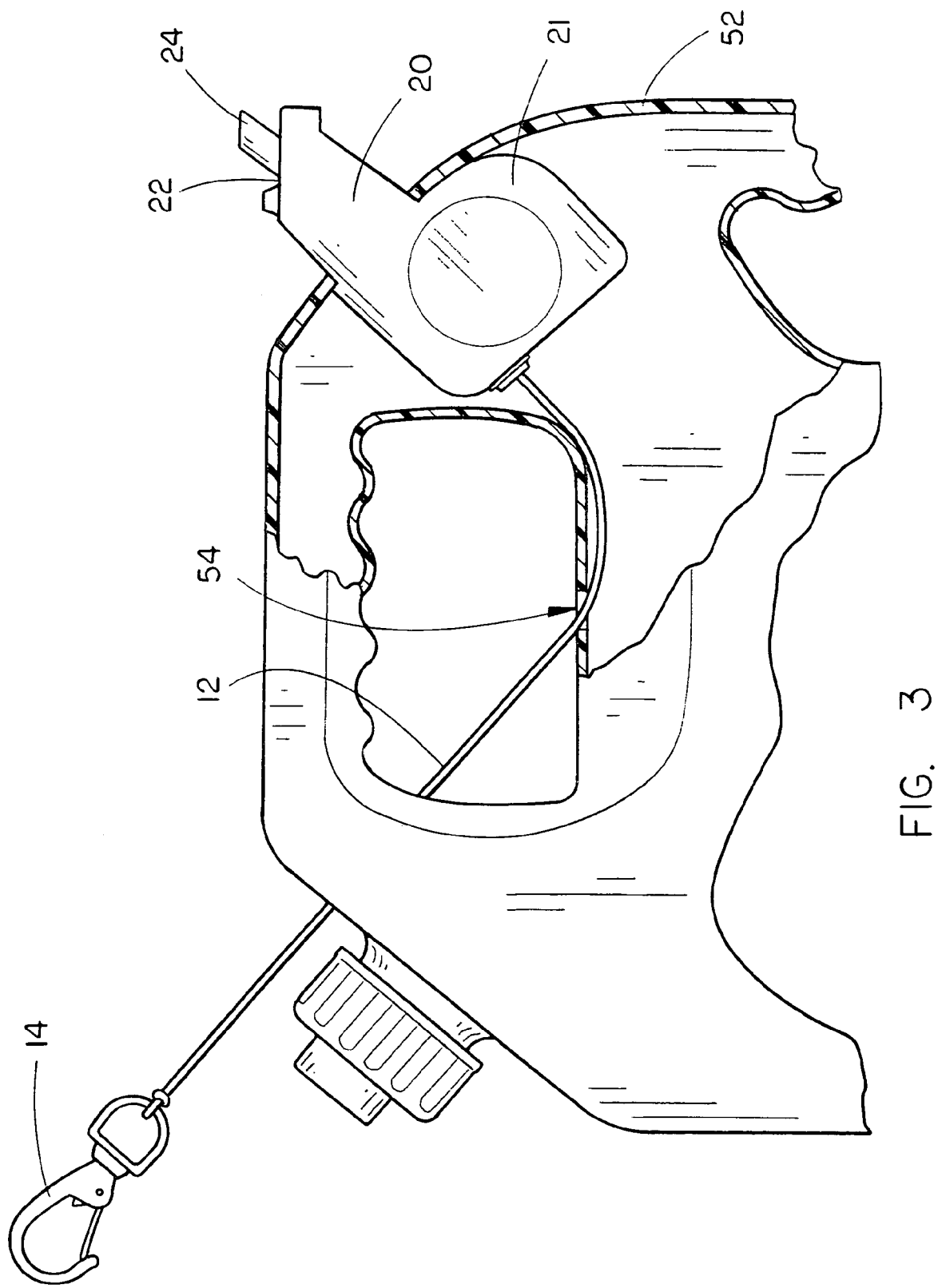
FIG. 3 is a detailed side elevational view of the safety strap device mounted within the fuel container showing how the safety strap extends outwards from the strap retracting mechanism.

The safety strap device 10 of the present invention is shown best in FIGS. 1-3 as including a safety strap 12 which extends outwards from a strap retracting device 20 mounted within the fuel container 50. In the preferred embodiment, the safety strap 12 would preferably have a length of approximately 5 to 10 feet and would be constructed of either a treated fabric material or another flexible material which is generally non-elastic and also is resistant to corrosion caused by interaction with the fuel and/or fuel fumes found within the fuel container 50. Of course, it should be noted that the precise construction materials and design of the safety strap 12 may be modified or changed so long as it remains generally non-elastic and is resistant to corrosion, and therefore the safety strap 12 may be constructed as a cord, cable or any other appropriate flexible tensioning member.

Mounted on the outer end of safety strap 12 is a connecting hook 14 which, in the preferred embodiment, would be of any appropriate design and shape so long as the intended function of permitting the safety strap 12 to be secured to an appropriate securement point is permitted. It has been found that use of a generally J-shaped securement hook, however, affords the greatest flexibility in releasably connecting the safety strap 12 to a selected securement location.

At the opposite end of safety strap 12 is a strap retracting device 20, which, in the preferred embodiment, would be generally similar to retractable pet leashes of the kind currently being manufactured and sold for use in connection with the walking of pets. However, a brief description of the strap retracting device 20 will be beneficial to understand the functionality of the unit. Briefly, the safety strap 12 would be wound around a strap reel (not shown) mounted within the outer body 21 of the strap retracting device 20, the strap reel being spring biased to provide a powered retraction of the safety strap 12 onto the strap reel when outward tension on the safety strap 12 is removed. The strap retracting device 20 would further include a strap reel locking mechanism 22 which, when engaged, is operative to prevent rotation of the strap reel and thus prevent extension or retraction of the safety strap 12 from and into the strap retracting device 20. The strap reel locking mechanism 22 may be of any appropriate design so long as the intended function of preventing rotation of the strap reel within the strap retracting device 20 is maintained. One of the more common designs for such a locking mechanism would be to include a push button 24 on the external portion of the strap retracting device 20 which, when depressed, engages the strap reel locking mechanism 22 to prevent rotation of the strap reel and, when extended, disengages the strap reel locking mechanism 22.

In the preferred embodiment, the strap retracting device 20 would be mounted within the fuel container 50 extending through the outer wall 52 of the fuel container 50 as shown best in FIGS. 2 and 3. Although the precise location of the strap retracting device 20 within the fuel container 50 is not particularly critical to the present invention, it is preferred that it be positioned adjacent the top portion of the fuel container 50 so that the strap retracting device 20 does not come into direct contact with fuel stored within the fuel container 50. Furthermore, it may be advantageous to subdivide the interior volume of the fuel container 50 into a gasoline storage section and a strap device section separated from said gasoline storage section by a liquid-tight dividing wall in order to ensure that fuel will not come in contact with the strap retracting device 20.

It has also been found that positioning the strap retracting device 20 adjacent the top portion of the fuel container 50 makes it easier to extend the safety strap 12 outwards therefrom through a strap exit hole 54 formed in the outer wall 52 of fuel container 50 so that the safety strap 12 may be extended outwards from the fuel container 50 for securement to an appropriate selected securement location. However, in the preferred embodiment of the safety strap device 10 of the present invention, the strap retracting device 20 and safety strap 12 would be integrated into the fuel container 50 in a manner such that no additional strap exit hole 54 need be included to permit the safety strap 12 to extend outwards from the fuel container 50.

The operation of the safety strap device 10 of the present invention is best shown in FIGS. 1 and 2 in which the safety strap 12 would be extended from the strap retracting device 20 by unreeling the safety strap 12 from the strap reel through the strap exit hole 54 in outer wall 52 in fuel container 50. Once the safety strap 12 has been extended the desired distance, the securement hook 14 would be releasably connected to the selected securement location 60, as shown in FIG. 1, and the biasing of the strap reel retracts the safety strap 12 into the strap retracting device until safety strap 12 is tensioned between the securement location 60 and the strap exit hole 54 in outer wall 52 of fuel container 50. At this point, the operator of the safety strap device 10 would engage the strap reel locking mechanism 22 by depressing push button 24 on strap retracting device 20 thus locking the strap reel and preventing extension or retraction of the safety strap 12 from the strap retraction device 20. This prevention of extension or retraction of the safety strap 12, combined with the generally non-elastic nature of the safety strap 12, ensures that the length of the strap extending between the securement location 60 and strap exit hole 54 will not substantially change until the strap reel locking mechanism 22 is released. As can be seen in FIG. 1, this ensures that even if sideways forces are applied to the fuel container 50 which thus attempt to tip the fuel container 50 over on its side, as would occur during turning of the vehicle, this tipping motion is prevented due to the connection of the safety strap 12 to the securement location 60 within the vehicle 70. Furthermore, the safety strap 12 also prevents substantial movement of the fuel container 50 relative to the resting location of the fuel container 50, and thus tipping, tilting or other undesirable movement of the fuel container 50 is substantially prevented.

Once transport of the fuel container 50 is completed and the vehicle 70 has safely come to a stop, it is then time to release the strap reel locking mechanism 52 by releasing the push button 24 thus permitting extension or retraction of the safety strap 12 from the strap retracting device 20. The securement hook 14 would then be removed from the securement location 60 within vehicle 70 and the biasing of the strap reel would retract the safety strap 12 into the strap retracting device 20 until securement hook 14 is positioned generally adjacent strap exit hole 54 in outer wall 52 of fuel container 50. The fuel container 50 is then ready for use for dispensing of fuel therefrom and the safety device 10 of the present invention has thus performed its intended function.

It is to be understood that numerous additions, modifications and substitutions may be made to the safety strap device 10 of the present invention which fall within the intended broad scope of the above description. For example, the size, shape and construction materials used in connection with the various elements of the present invention may be modified or changed so long as the intended functional features of those elements are maintained. Furthermore, although the strap retracting device 20 of the present invention has been described as being positioned within the fuel container 50, it may be advantageous to mount the strap retracting device 20 on the exterior of the fuel container 50, preferably adjacent the top portion thereof, in order to provide substantially the same functionality as was described in connection with the preferred embodiment of the present invention. Such a modification may eventually prove to be more desirable due to the isolation of the strap retracting device 20 from the fuel stored within the fuel container 50. Also, it should be noted that although the present invention has been described as being intended primarily for use in motor vehicles, it should be clear that the safety strap device 10 of the present invention can be used in many different situations where it is important to keep the fuel container 50 upright, such as in trucks, trailers, garages, basements and any other storage or transport location. Finally, the precise nature of the strap reel locking mechanism 22 may be modified or changed so long as the locking mechanism performs its intended function of preventing rotation of the strap reel when the strap reel locking mechanism 22 is engaged.

There has therefore been shown and described a safety strap device 10 for fuel containers which accomplishes at least all of its intended objectives.

I claim:

1. A safety strap device for hazardous materials containers comprising:
    a hazardous materials container having an outer wall;
    a retractable safety strap device mounted within said hazardous materials container, said safety strap device including:
        an extendable and retractable securement safety strap means having an outer end, said securement safety strap means extending outwards from said safety strap device through said outer wall of said hazardous materials container;
        biasing means operatively associated with said securement safety strap means for forcibly retracting said securement safety strap means into said safety strap device;
        strap extension and retraction locking means operatively associated with said securement safety strap means for, said locking means operative to prevent extension and retraction of said securement safety strap means when engaged; and
    latch means mounted on said outer end of said securement safety strap means for releasably connecting said securement safety strap means to a selected securement point thereby releasably securing said hazardous materials container in an upright position.

2. The safety strap device for hazardous materials containers of claim 1 wherein said hazardous materials container is a gasoline container.

3. The safety strap device for hazardous materials containers of claim 1 wherein said securement safety strap means is constructed of a generally non-elastic flexible fabric material.

4. The safety strap device for hazardous materials containers of claim 1 wherein said biasing means comprises a spring biased strap reel which provides powered retraction of said securement safety strap means onto said strap reel upon outward tension on said securement safety strap means being removed.

5. The safety strap device for hazardous materials containers of claim 4 wherein said strap extension and retraction locking means comprises a strap reel locking mechanism which, when engaged, is operative to prevent rotation of said strap reel and thereby prevent extension or retraction of said securement safety strap means from and into said retractable safety strap device.

6. The safety strap device for hazardous materials containers of claim 1 wherein said latch means comprises a generally J-shaped securement hook.

7. A safety strap device for gasoline containers comprising:
    a gasoline container having an outer wall;
    a retractable safety strap device mounted within said gasoline container, said safety strap device including:
        an extendable and retractable securement safety strap having an outer end, said securement safety strap extending outwards from said safety strap device through said outer wall of said gasoline container;
        a generally cylindrical strap reel for reeling said securement safety strap thereon;
        spring-loaded biasing means operatively associated with said strap reel for forcibly rotating said strap reel for retraction of said securement safety strap into said safety strap device;
        a strap reel locking mechanism operative to prevent rotation of said strap reel when engaged and thereby prevent extension or retraction of said securement safety strap from and into said retractable safety strap device; and latch means mounted on said outer end of said securement safety strap for releasably connecting said securement safety strap to a selected securement point thereby releasably securing said gasoline container in an upright position.

8. The safety strap device for gasoline containers of claim 7 wherein said securement safety strap is constructed of a generally non-elastic treated flexible fabric material.

9. The safety strap device for gasoline containers of claim 7 wherein said latch means comprises a generally J-shaped securement hook.

10. A safety strap device for gasoline containers comprising:

a gasoline container having an outer wall, a gasoline storage section and a strap device section separated from said gasoline storage section by a liquid-tight dividing wall;

a retractable safety strap device mounted within said gasoline container within said strap device section, said safety strap device including;

an extendable and retractable securement safety strap having an outer end, said securement safety strap extending outwards from said safety strap device through said outer wall of said gasoline container;

a generally cylindrical strap reel for reeling said securement safety strap thereon;

spring-loaded biasing means operatively associated with said strap reel for forcibly rotating said strap reel for retraction of said securement safety strap into said safety strap device;

a strap reel locking mechanism operative to prevent rotation of said strap reel when engaged and thereby prevent extension or retraction of said securement safety strap from and into said retractable safety strap device; and latch mounted on said outer end of said securement safety strap for releasably connecting said securement safety strap means to a selected securement point thereby releasably securing said gasoline container in an upright position.

11. The safety strap device for gasoline containers of claim 10 wherein said securement safety strap is constructed of a generally non-elastic treated flexible fabric material.

12. The safety strap device for gasoline containers of claim 10 wherein said latch means comprises a generally J-shaped securement hook.

* * * * *